April 12, 1960 D. L. CURTIS 2,932,778

FREQUENCY COMPARISON RATE SERVO

Original Filed Dec. 24, 1956 2 Sheets-Sheet 1

INVENTOR.
Daniel L. Curtis

By Seymour Scholnick

Attorney

FREQUENCY COMPARISON RATE SERVO

Original Filed Dec. 24, 1956

2 Sheets-Sheet 2

INVENTOR:
Daniel L. Curtis

By Seymour Schalnick
Attorney

United States Patent Office 2,932,778

Patented Apr. 12, 1960

2,932,778

FREQUENCY COMPARISON RATE SERVO

Daniel L. Curtis, Manhattan Beach, Calif., assignor to Litton Industries of California, Beverly Hills, Calif.

Continuation of application Serial No. 630,261, December 24, 1956. This application May 6, 1959, Serial No. 811,501

13 Claims. (Cl. 318—314)

The present invention relates to a rate servo for maintaining the speed of a moveable element proportional to the frequency of standard frequency signals and more particularly to a rate servo wherein a moveable element is accelerated or decelerated according to the phase and frequency difference between the standard frequency signals and the variable frequency signals, produced by the moveable element. This application is a continuation of my copending U.S. patent application Serial No. 630,261, filed December 24, 1956.

It has been frequently found necessary to maintain the speed of a moveable element proportional to some standard frequency. A few of the more common applications of this form of speed control are in magnetic recording devices, either in the audio or video field, in tracking systems, and especially in controlling a magnetic drum speed in computer work. In computer work, for example, it is necessary to maintain the frequency of revolution of a magnetic drum in synchronism with standard frequency signals such as those obtained from the operation of a tuning fork.

In the prior art, the magnetic drum is synchronized by one of two methods. According to the first method, standard frequency signals generated from a tuning fork are first amplified by a power amplifier and applied to a synchronous motor to rotate the motor at a frequency equal to the frequency of the applied signal. This system, however, has several severe limitations.

It is a well-known fact that a synchronous motor is less efficient than other types of motors and therefore requires more power to provide a specified drum speed than such other types of motors. This power must be provided by the power amplifier, as it is clear that the tuning fork produces a signal of little or no power. A power amplifier capable of producing the required amount of power will of necessity be large, heavy and relatively expensive. In most applications, and particularly in computers designed for airborne use, the advantages of small size and light weight cannot be overemphasized.

In addition, the synchronous motor, being less efficient, produces more heat in operation, thereby heating the surrounding area to a greater degree, than if some other type of motor were used. Therefore, the equipment surrounding the motor may be damaged by the excessive heat, unless means for cooling the area are provided.

As was stated earlier, size and weight are critical with respect to airborne computers. In order to reduce the size and weight of non-airborne computers, as well as airborne computers, the present trend in the art is to miniaturize computers by designing computers using transistors, instead of conventional vacuum tubes. The power amplifier system, hereinbefore described, does not, however, lend itself readily to miniaturization, due to the fact a power amplifier capable of producing the required amounts of power is difficult to mechanize using transistor techniques known to the art.

The second method in which the prior art synchronized a magnetic drum with respect to a standard frequency is by means of a phase servo system. The phase servo system is responsive to standard frequency signals and variable frequency signals whose frequency is proportional to the speed of the drum, to produce alternate acceleration and deceleration signals, the relative duration of the acceleration or deceleration signals with respect to the other depending upon the phase of the variable frequency signals with respect to the standard frequency signals.

The phase servo system, in its most common embodiment, is mechanized by the use of a flip-flop circuit, which is a well-known circuit in the art. The standard frequency signals are applied to one input of the flip-flop circuit, while the variable frequency signals are applied to the other input. A bilevel voltage signal will be produced at one output terminal of the flip-flop circuit, the duration of one voltage level to the other being dependent upon the phase relationship of the variable frequency signals with respect to the standard frequency signals.

When the frequency of the variable frequency signals and the standard frequency signals are equal and out of phase by 180°, the duration of one level of the flip-flop output signal will be equal to the duration of the second level. If one level is thought of as an acceleration signal and the other level as a deceleration signal, it can be seen that when the frequency of the variable frequency signals equals that of the standard frequency signals the phase servo will produce alternate acceleration and deceleration signals of equal duration, therefore, holding the drum, whose speed is proportional to the variable frequency signals, in synchronism with the standard frequency signals.

If a disturbance should occur, such as would cause the frequency of the variable frequency signals to increase slightly, the phase of the variable frequency signals would advance slightly with respect to the standard frequency signals. The standard frequency signals and variable frequency signals are applied to the inputs of the flip-flop circuit in such a manner that this phase change will cause the duration of the deceleration signal to increase and that of the acceleration signal to decrease, therefore, tending to slow down the drum and, in turn, the frequency of the variable frequency signals.

If, however, a disturbance should occur that would cause a frequency change in the variable frequency signals such that the phase of the variable frequency signals would advance or be retarded more than 180°, the phase servo system loses its ability to sense the direction of error. Therefore, the system under these conditions would apply an erroneously directed acceleration or deceleration signal, such that the system may never again be able to synchronize the drum. Even if synchronism is again achieved the drum will have lost several revolutions with respect to the standard frequency signals. The phase servo system is, therefore, of limited utility when even a moderate degree of accuracy is required.

In contrast to the prior art, the present invention provides a relatively simple rate servo system that can maintain the speed of a moveable element, such as a motor shaft, in synchronism with the frequency of standard frequency signals, no matter how great the difference in frequency between the standard frequency signals and the variable frequency signals. In addition, the system, according to the invention, is not restricted to the use of a synchronous motor but can use any type of motor to drive the moveable element, for example, an induction motor. Further, according to a preferred embodiment of the invention, the synchronizing system can be mechanized by the use of two flip-flop circuits and a small number of gating circuits, rather than a relatively large power amplifier.

According to the basic concept of the present invention, the rate servo system is responsive to the standard frequency signals and the variable frequency signals to produce acceleration and deceleration signals when the ratio of the frequencies of the variable frequency signals and the standard frequency signals is less than and greater than a predetermined number, respectively. More particularly, according to preferred embodiments of the invention, the servo system produces acceleration and deceleration signals when the frequency of the variable signals is less and greater than that of the standard signals, respectively.

The preferred method by which the invention accomplishes this result is as follows. The variable frequency signals and standard frequency signals are made up of sharp electrical impulses so that when the frequency of the variable frequency signals, for example, exceeds the frequency of the standard frequency signals, a larger number of electrical impulses of the variable frequency signals must occur, per unit time, than of the standard frequency signals. Therefore, there will be intervals when two sharp electrical impulses of the variable frequency signals will occur within the time lapse between the occurrence of sharp electrical impulses of the standard frequency signals. Accordingly, by making the rate servo of the invention responsive to two successive variable frequency signals to produce a decelerating signal and to two successive standard frequency signals to produce an accelerating signal, the moveable element is controlled in such a manner as to become and remain synchronized with respect to the standard frequency signals.

However, when the frequency and phase of the variable frequency signals and the standard frequency signals are equal, the sharp electrical impulses of the two signals occur simultaneously. This may cause the rate servo of the invention to become ambiguous in its operation and to produce an erroneous acceleration or deceleration signal.

For extremely accurate synchronization work a modified rate servo system, according to the invention, can be made to operate in such a manner that extremely accurate synchronization can be maintained even when the variable frequency and standard frequency signals are equal or nearly equal in both phase and frequency.

In a modified embodiment of the invention which is described in the present specification, a rate servo system is provided that is relatively simple in structure and which will remove this erroneous acceleration or deceleration signal set forth above. According to this embodiment of the invention, the system responds to the variable frequency signals and the standard frequency signals to provide acceleration and deceleration signals whose durations are related to the phase of the variable frequency signals with respect to the standard frequency signals when the phase and frequencies of the two signals are equal and thereafter; and to the frequencies of the two signals when the frequencies of the two signals are substantially different and thereafter.

The rate servo system according to the modified embodiment of the invention, therefore, has two modes of operation, a frequency mode and a phase mode. This dual mode, phase-frequency servo is operable in the frequency mode of operation, when two successive variable frequency signals or two successive standard frequency signals occur and in a phase mode of operation, when the standard frequency signals and the variable frequency signals occur simultaneously. The dual mode, phase-frequency servo, further, is operable to switch back and forth from one mode of operation to the other, when the proper conditions for operation in a particular mode occur.

It is therefore an object of the present invention to provide a rate servo for driving a moveable element at a velocity proportional to the frequency of applied standard frequency signals.

It is another object of the invention to provide a dual mode, phase-frequency rate servo.

A further object of the invention is to provide a dual mode, rate servo for driving a moveable element at a velocity proportional to the frequency of applied standard frequency signals.

Still another object of the invention is to provide a dual mode, phase-frequency rate servo for controlling the power applied to a motor to maintain the frequency and phase of the motor shaft constant relative to applied standard frequency signals.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

Figure 1:
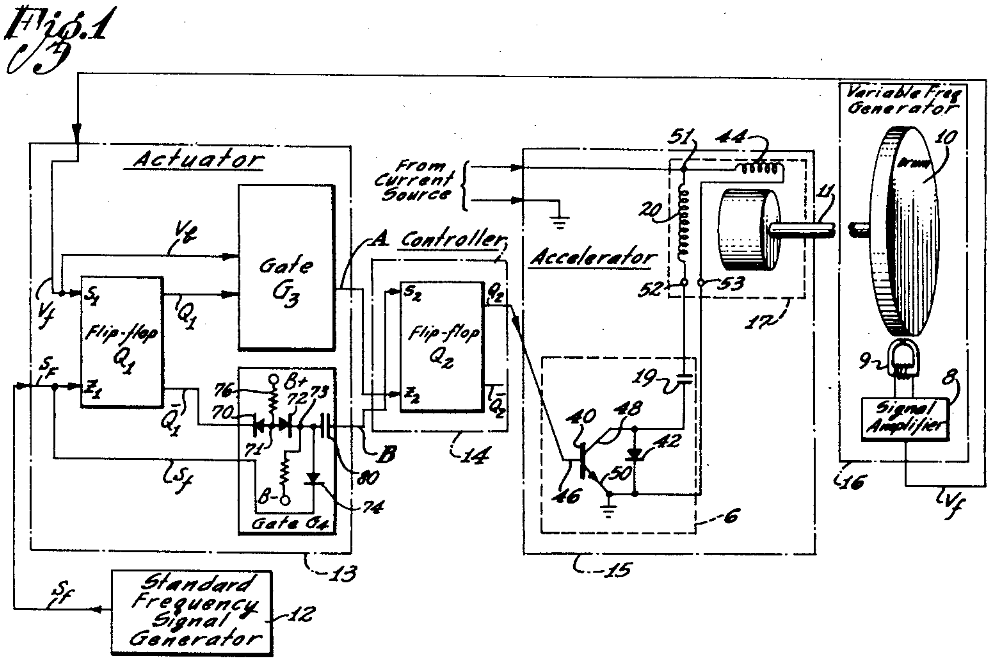
Fig. 1 is a partly block, partly circuit diagram of a preferred embodiment of a rate servo, in accordance with the present invention.

Referring now to the drawings, wherein like or corresponding parts are designated by the same reference characters throughout the several views, there is shown in Fig. 1 a frequency form of rate servo, according to the invention, which is operative to drive a moveable element 11 at a speed proportional to the frequency of constant frequency signals $S_f$, emitted by a standard frequency signal generator 12. It will be recognized by those skilled in the art that the standard frequency signal generator may embody any of several well-known structures for generating such a signal, as for example, a tuning fork.

As shown in Fig. 1, the rate servo includes four basic components: a variable frequency generator 16 which is coupled to moveable element 11 for generating variable frequency signals $V_f$, whose frequency is proportional to the speed of the moveable element 11; an actuator 13 which is responsive to the variable frequency signals $V_f$ and the standard frequency signals $S_f$ for producing resultant actuating signals designated A and B, respectively; a controller 14 which is responsive to actuating signals A and B for producing a control signal $Q_2$ having either a high or low level in accordance with the applied actuating signals; and an accelerator 15 which responds to signal $Q_2$ by accelerating or decelerating moveable element 11 in accordance with the high or low level of control signal $Q_2$.

As specifically shown in Fig. 1, moveable element 11 may be the output shaft of a motor 17. Variable frequency generator 16 may then include a drum 10 which is coupled to the motor shaft 11 in such manner that the drum rotates in synchronism with the motor shaft. Placed on the drum are one or more equally spaced magnetic spots and a magnetic pick-up head 9 which is mounted next to the drum in such a manner that the spot or spots on the drum pass adjacent the head. When a magnetic spot passes the magnetic pick-up head a pulse is generated by the head which is applied to a signal amplifier 8, signal amplifier 8 functioning to amplify and shape the pulses to form the variable frequency signals $V_f$, the frequency of signals $V_f$ being therefore proportional to the speed of motor shaft 11.

As shown in Fig. 1, variable frequency signals $V_f$ and standard frequency signals $S_f$ are applied to actuator 13 over correspondingly designated conductors $V_f$ and $S_f$, respectively. (For purposes of facilitating and clarifying description, each conductor will be hereinafter similarly designated in terms of the signal applied over the conductor.) Actuator 13 functions to produce actuating signals A as sharp negative pulses on output conductor A when the frequency of signals $V_f$ is greater than the frequency of signals $S_f$, and to produce actuating signals B on output conductor B when the frequency of signals $V_f$ is less than the frequency of signals $S_f$. More particularly actuator 13 functions to produce a signal A whenever two successive $V_f$ impulses are received and a signal B whenever two successive $S_f$ signals are received. Controller 14 is responsive to each actuating signal A for producing signal $Q_2$ at its high voltage level and is responsive to each actuating signal B for producing signal $Q_2$ at its low level. In turn, accelerator 15 responds to the high or low level of signal $Q_2$ by accelerating motor shaft 11 with a high or low magnitude acceleration, respectively.

Referring now with particularity to the structure and operation of actuator 13, as shown in Fig. 1 actuator 13 is seen to comprise a flip-flop $Q_1$ and a pair of gates $G_3$ and $G_4$. Flip-flop $Q_1$ has a pair of inputs designated as the S input and Z input respectively, each input being further designated by the numeric subscript 1 corresponding to the numerical designation of the flip-flop. Flip-flop $Q_1$ produces an output signal $Q_1$ having high or low voltage levels in accordance with the state of the flip-flop and also produces an output signal $\bar{Q}_1$ having opposite or complementary voltage levels.

In operation flip-flop $Q_1$ is responsive to the application of an input signal to its S input conductor for being set to its "set" state and to the application of an input signal to its Z input conductor for being set to its "zero" state. When flip-flop $Q_1$ is in its "set" state, signal $Q_1$ will be at its high level while complementary signal $\bar{Q}_1$ will be at its low level. Conversely when flip-flop $Q_1$ is in its "zero" state, signal $Q_1$ will be at a low level while complementary signal $Q_1$ will be at a high level. The detailed structure for one suitable form of flip-flop can be found in U.S. Patent No. 2,733,430 issued January 31, 1956, for "Angular Quantizer," by Floyd G. Steele.

Gates $G_3$ and $G_4$ may be identical in structure and function. Gates $G_3$ and $G_4$ can be any one of the well-known types of pulse operated "and" gates for passing an impulse under the control of the high or low voltage levels of an applied signal. As shown in Fig. 1, each "and" gate includes two inputs and a single output and is responsive to a high level voltage signal applied to one input and to a sharp negative pulse applied to the other input conductor, to produce a sharp negative pulse at the output of the gate.

As shown in Fig. 1, gate $G_4$ includes a diode 70, whose cathode is connected to the input conductor $\bar{Q}_1$ and whose anode is connected to a terminal 71 and is also coupled through a pull-up resistor 76 to a source of relatively high voltage B+. The anode of a diode 72 is connected to common terminal 71 and the cathode of diode 72 is connected to terminal 73 and is also coupled through a pull-down resistor 78 to a source of relatively low voltage B−. The cathode of a diode 74 is connected to input conductor $S_f$, while the anode is connected to terminal 73 and one terminal of capacitor 80, the other terminal of capacitor 80 being connected to output conductor B.

As shown in Fig. 1, terminal 73 will be at a high or low voltage level when signal $\bar{Q}_1$ is at a high or low voltage level, respectively. The rate at which the voltage at terminal 73 changes when signal $\bar{Q}_1$ changes its voltage level is limited by the size of pull-up resistor 76 and pull-down resistor 78 in such a manner that the resultant differentiated pulse formed by capacitor 80 in response to these voltage changes will be small enough so that flip-flop $Q_1$ will not be triggered thereby. When an $S_f$ signal is applied to the cathode of diode 74, the $S_f$ signal will abruptly pull-down the voltage at terminal 73 if that voltage is at a high level and will leave it unchanged if the voltage is at a low level, as it cannot be made to go any lower. Thus when the voltage at terminal 73 is at a high level and is abruptly pulled down by the $S_f$ pulse, capacitor 80 will form a sharp negative pulse which will trigger flip-flop $Q_2$, while if the voltage at terminal 73 is low at the time $S_f$ is applied, capacitor 80 will produce no output pulse and flip-flop $Q_1$ will not be triggered. Gate $G_3$ operates in the same fashion to produce a negative output pulse when a high level signal is present at one input simultaneously with the application of a $V_f$ signal at the other input.

As shown in Fig. 1 pulse signals $V_f$ are applied both to the S input of flip-flop $Q_1$ and to one input of gate $G_3$ while pulse signals $S_f$ are applied to the Z input of flip-flop $Q_1$ and also to one input of gate $G_4$. The bilevel flip-flop output signals $Q_1$ and $\bar{Q}_1$ are applied to the other inputs of gates $G_3$ and $G_4$, respectively. Gates $G_3$ and $G_4$ are responsive to these applied input signals for respectively producing the actuating signals A and B, which as hereinbefore described are applied to controller 14.

As shown in Fig. 1, controller 14 comprises one major component, a flip-flop $Q_2$ which is operable in the same manner as flip-flop $Q_1$. Flip-flop $Q_2$ has a pair of inputs designed as $S_2$ and $Z_2$ and is responsive to signals applied to these inputs for producing as its output the control signal $Q_2$ and also a complementary output signal $\bar{Q}_2$. It is seen, referring to Fig. 1, that actuating signals A are applied to the $Z_2$ input of flip-flop $Q_2$ while actuating signals B are applied to the S input of flip-flop $Q_2$. In operation, it is clear that controller 14, responds to each application of an actuating signal A or an actuating signal B for producing control signal $Q_2$ at its low and high voltage levels respectively, control signal $Q_2$ as hereinbefore described being applied to accelerator 15.

Accelerator 15 as illustrated in Fig. 1, comprises a motor 17, and a power regulating circuit 6 for regulating the amount of power delivered to the motor from an external current source not shown in accordance with the high or low voltage levels of control signal $Q_2$.

Motor 17 includes a motor coil 44 and a motor coil 20 having a common input terminal 51 and output terminals designated 52 and 53, respectively. Power regulating circuit 6 comprised a diode 42, a capacitor 19 and a transistor 40 having a base electrode 46, a collector electrode 48, and an emitter electrode 50. As shown in Fig. 1 conductor $Q_2$ is connected to base electrode 46 and emitter 50 is connected to a source of ground potential while collector 48 is connected to one side of capacitor 19, the other side of capacitor 19 being connected to terminal 52 of motor winding 20. Diode 42 is connected between collector 48 and emitter 50 (and thus to the source of ground potential). Terminal 53 of winding 44 is also connected to the source of ground potential.

In operation, assuming that alternating current is supplied to the current source, it is clear that current will continuously flow through motor coil 44 at a constant rate to the source of ground potential, thereby producing a constant low level accelerating force on motor shaft 11. Additional accelerating force may be provided by current flowing through motor coil 20 and then through power regulating circuit 6 to the source of ground potential. It is clear that if transistor 40, within power regulating circuit 6, is biased off (non-conductive) by signal $Q_2$ having a low level (assuming transistor 40 is an NPN transistor) current can pass only through diode 42, during the positive half cycle of the current, and then only until capacitor 19 becomes fully charged, at which time all current flow through motor coil 20 will cease. However, if transistor 40 is biased conductive by signal $Q_2$ at its high level, transistor 40 will be capable of passing the negative half cycle of the A.C. signal, the positive half cycle passing as before through diode 42, so that full current flows through coil 20. Therefore, when transistor 40 is biased by signal $Q_2$ at a high level, current will flow through both motor coils 20 and 44 thus producing a high level accelerating force upon motor shaft 11, while when transistor 40 is biased off by signal $Q_2$ at its low level, current will flow only through motor coil 44 and a resultant low level accelerating force will be applied to motor shaft 11.

It is therefore clear that in overall operation accelerator 15 responds to the high or low voltage levels of signal A for applying a corresponding high or low level accelerating force to motor shaft 11 to thereby accelerate shaft 11 to a relatively high velocity or to allow motor shaft 11 to be decelerated (by frictional forces and other effects) to a relatively low velocity.

It will be recognized by those skilled in the art, that the particular embodiment of power regulating circuit 6, shown in Fig. 1 is only one of many structures whereby the flow of power to motor 17 may be regulated by control signal $Q_2$ and it is not intended that the invention should be limited to the particular power regulating circuit shown. For example, a coventional relay circuit may conveniently be utilized to control the power applied by motor 17 or in other embodiments an eddy current brake or negative clutch may be used to control the power delivered by motor 7 to shaft 11.

Referring now with particularity to actuator 13, as hereinbefore mentioned, flip-flop $Q_1$ receives standard frequency signals $S_f$ at its Z input and variable frequency signals $V_f$ at its S input. It will be remembered that when flip-flop $Q_1$ is in its "zero" state, signal $Q_1$ will be at a low voltage level thus blocking the passage of any $V_f$ pulse signals through gate $G_3$ since as hereinbefore described gate $G_3$ will pass signals $V_f$ to form resultant actuating signals A only when a high level voltage signal is applied to gate $G_3$ over conductor $Q_1$.

It is well-known that in the operation of a flip-flop, a certain delay time is introduced between the time a set or zero signal is received and the actual change in state of the flip-flop. It is therefore clear that if flip-flop $Q_1$ is initially in its "zero" state at the time a $V_f$ signal is applied, that $V_f$ signal will not be passed through gate $G_3$ since at the time the $V_f$ signal arrives at gate $G_3$, flip-flop $Q_2$ will not yet have changed from its "set" to its "zero" state so that signal $Q_1$ will be at a low level blocking the passage of the $V_f$ signal. Accordingly, it is clear that a $V_f$ pulse will be passed through gate $G_3$ to form an actuating signal A only when flip-flop $Q_1$ is initially in a "set" state preceding the application of the $V_f$ signal to the actuator. Since as hereinbefore mentioned, a $V_f$ pulse must be applied to actuator 13 in order to "set" flip-flop $Q_1$, it is therefore clear that two successive $V_f$ signals must be received by actuator 13 in order to produce an actuating signal A from gate $G_3$. By the same reasoning it can be shown that two successive $S_f$ signals must be applied to actuator 13 to produce an actuating signal B from gate $G_4$.

Continuing further with the description of operation, as hereinbefore described, each actuating signal B will set flip-flop $Q_2$ to its "set" state, thereby raising signal $Q_2$ to its high level at base electrode 46 of transistor 40. On the other hand, each actuating pulse A will cause flip-flop $Q_2$ to be zeroed, therefore causing signal $Q_2$ to be at its low level at base electrode 46 within accelerator 15. In response thereto, accelerator 15 applied high accelerating forces to motor shaft 11 when signal $Q_2$ is at a high voltage level, and applies relatively low accelerating forces to motor shaft 11 when signal $Q_2$ is at a low level.

It can be seen, then, that two successive standard frequency pulses $S_f$ will cause more power to flow to the motor and thus accelerate moveable element 11. On the other hand two successive variable frequency signals $V_f$ will cause less power to flow to the motor and a deceleration of moveable element 11 will occur. Actuator B will receive two successive standard frequency signals only when the frequency of variable frequency signal is less than that of the standard frequency signal, indicating that the velocity of moveable element 11 is too low. Thus it is clear that the resultant high acceleration applied has the correct effect of speeding up moveable element 11. On the other hand actuator 13 will receive two successive variable frequency signals only when the frequency of the variable frequency signals $V_f$ are greater than that of the standard frequency signal, thereby indicating that the velocity of moveable element 11 is too high and thus the resultant deceleration again has the correct effect on moveable element 11.

The frequency form of rate servo of the invention will maintain moveable element 11 at a velocity proportional to the frequency of the standard frequency signals with satisfactory accuracy in very nearly all applications of rate servos. However, it should be understood that when the phase and frequency of the standard frequency signal and the variable frequency signal become substantially equal because of inability of flip-flop $Q_1$ to resolve the nearly coincident pulses, there is a possibility that an incorrect A or B signal may be occasionally emitted causing a positive feedback signal to the motor and a resultant momentary loss of exact synchronism. Therefore, for applications of rate servo requiring an extremely high degree of accuracy, a modified form of the rate servo of the present invention, a dual mode, phase-frequency form of rate servo described hereinbelow is preferably utilized.

Figure 2:
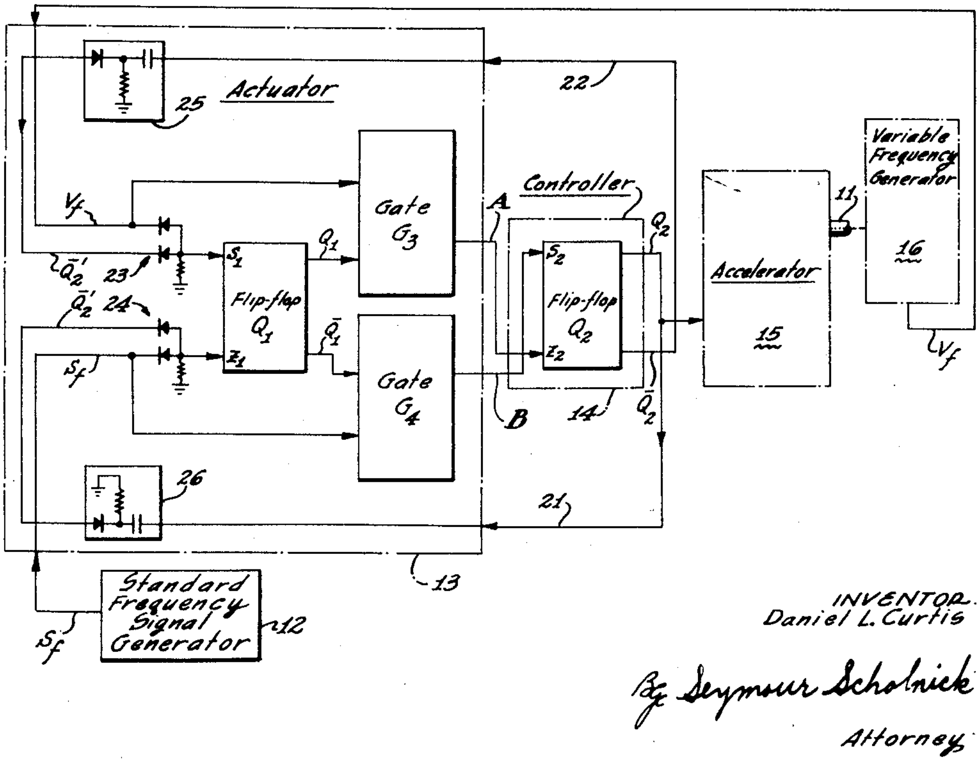
Fig. 2 is a partly block, partly circuit diagram of a modified embodiment of the rate servo, shown in Fig. 1.

Referring to Fig. 2, there is shown a dual mode phase-frequency form of rate servo, according to the invention, wherein the frequency form of rate servo described hereinabove is modified to a dual mode phase-frequency form of rate servo which basically operates as a frequency form rate servo until the frequency and phase of the variable frequency signals and the standard frequency signals near the point at which they are substantially equal, at which time the dual mode phase-frequency form of rate servo will change its form of operation so that it thereafter operates as a phase servo. If later the frequency of the variable frequency signal and the standard frequency signal again become substantially unequal for some reason, as for example in response to a disturbance in the current source the phase-frequency form of rate servo will at that time again change back to a frequency form of operation. As a result of this dual mode operation of the servo, the possible occasional ambiguities associated with the pure frequency form of rate servo (at substantial coincidence of $S_f$ and $V_f$ signals) are entirely eliminated, while all of the desirable features of the described frequency form of rate servo (for substantial deviations between $S_f$ and $V_f$ signals) are retained.

The dual mode phase-frequency servo shown in Fig. 2 is modified with respect to the frequency form of rate servo of Fig. 1 by the addition of apparatus for feeding back the output signals produced by controller 14 as additional inputs to actuator 13. From the additional information provided by these feedback signals, actuator 13 is enabled to change its mode of operation from frequency comparison to phase comparison and vice versa at the proper times.

As illustrated in Fig. 2, the output signals $Q_2$ and also a complementary output signal $\bar{Q}_2$ of controller 14 are fed back to actuator 13 over corresponding conductors 21 and 22, signals $Q_2$ and $\bar{Q}_2$ being applied within actuator 13 to the inputs of a pair of differentiating circuits 26 and 25 respectively to form corresponding differentiated output signals $Q'_2$ and $\bar{Q}'_2$, respectively. As illustrated in Fig. 2, the differentiated signal $\bar{Q}'_2$ are mixed in a conventional mixing circuit 23 with signals $V_f$ for application to the S input of flip-flop $Q_2$ while the differentiated signals $Q'_2$ are mixed in another mixing circuit 24 for application to the Z input of flip-flop $Q_1$.

Differentiating circuits 25 and 26 function to produce sharp negative pulses $\bar{Q}'_2$ and $Q'_2$, respectively whenever the corresponding input signal $\bar{Q}_2$ or $Q_2$ change from a high to low voltage level. The operation and structure of such differentiating circuits is well-known to one skilled in the art.

It is clear in view of the foregoing that signal $\bar{Q}'_2$ will be applied to the S input of flip-flop $Q_1$ to set flip-flop $Q_1$ whenever flip-flop $Q_2$ changes from its "zero" state to its "set" state while signal $Q'_2$ will be applied to the Z input of flip-flop $Q_1$ to zero flip-flop $Q_1$ whenever flip-flop $Q_2$ changes from its "set" state to its "zero" state.

Figure 3:
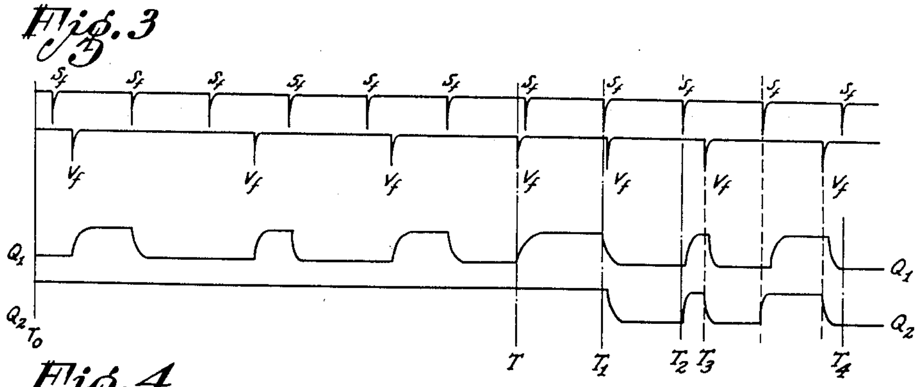
Figs. 3 and 4 are composite diagrams of waveforms of the signals produced by the embodiment of the rate servo shown in Fig. 2.

Referring now with particularity to the operation of the dual mode phase-frequency form of rate servo shown in Fig. 2, it will be understood that until the phase and frequency of the variable frequency signals and the standard frequency signals are substantially equal, the dual mode phase-frequency form of rate servo system will function in its frequency mode of operation. An illustration of the operation of the phase-frequency form of the rate servo near and at the point where the phase and frequency of the variable frequency signals and the standard frequency signals are equal, refer to Fig. 3, wherein, is shown a series of standard frequency signals $S_f$ and variable frequency signals $V_f$ plotted on a common time scale. There is also illustrated in Fig. 3 on the same time scale the corresponding wave-forms of output signals $Q_1$ and $Q_2$ of flip-flops $Q_1$ and $Q_2$, respectively. Assuming as shown in Fig. 3 that the frequency of the $V_f$ signals is initially much less than the frequency of the $S_f$ signals, then as hereinbefore mentioned the dual mode phase-frequency form of rate servo will operate in its frequency mode. As shown at time $T_0$ of Fig. 3, flip-flop $Q_2$ is initially assumed to be in its "set" state so that signal $Q_2$ is at a high level causing motor 17 to accelerate moveable element 11.

As described in connection with Fig. 1, as long as two successive $S_f$ signals occur between each pair of signals $V_f$, flip-flop $Q_2$ will remain "set," thereby maintaining signal $Q_2$ at a high level, while flip-flop $Q_1$ will alternate from one of its states to the other. As hereinbefore mentioned, signal $Q_2$ at its high level will cause moveable element 11 to be accelerated, thereby causing the frequency of the $V_f$ signals to increase, as is shown in Fig. 3. As the frequency of the $V_f$ signals increases, a point will be reached where the frequency and phase of the two signals are near equal, as shown at point T of Fig. 3. At this point the dual mode phase servo commences to change over to its phase form of operation.

Directing attention to Fig. 3, there is shown a $V_f$ signal occurring at time T and an $S_f$ signal occurring in near coincidence with the time $TV_f$ signal. Assume that flip-flops $Q_1$ and $Q_2$ and in their "zero" and "set" states, respectively, before the occurrence of the time $TV_f$ signal, as shown in Fig. 3. It will be understood that whenever an $S_f$ and $V_f$ signal are applied to flip-flop $Q_1$ in near coincidence, the flip-flop will change its state without regard to its prior state or to whether the $S_f$ or $V_f$ signal occurs first. Therefore, when the $S_f$ signal occurring at time T and the nearly coincident $V_f$ signal is applied to flip-flop $Q_1$ the flip-flop perforce changes from its "zero" state to its "set" state.

Thereafter at time $T_1$, very nearly coincidental $V_f$ and $S_f$ signals are again applied to flip-flop $Q_1$, and flip-flop $Q_1$ again changes its state this time from its "set" state to its "zero" state. When flip-flop $Q_1$ is zeroed signal $Q_1$ will go from a high level to a low level but since it will take a finite period of time for this change to take place, signal $Q_1$ will still be at a high level when the following $V_f$ signal is applied to gate $G_3$. As hereinbefore mentioned gate $G_3$ will in response thereto emit a negative activating signal A, which is applied to the Z input of flip-flop $Q_2$ to cause flip-flop $Q_2$ to be "zeroed" thererby causing a decelerating force to be applied to moveable element 11.

Since flip-flop $Q_2$ is changed from a "set" state to a "zero" state, signal $Q_2$ falls from a high level to a low level and as thereinbefore mentioned, differentiator 26 will in response thereto emit a negative pulse feedback signal $Q'_2$ which is applied to the Z input of flip-flop $Q_1$. However, since flip-flop $Q_1$ is already at its "zero" state when this feedback signal is applied, the feedback signal has no effect on flip-flop $Q_1$. At this time the dual mode phase frequency rate servo has completely changed its mode of operation from a frequency mode to a phase mode of operation.

As shown in Fig. 3, at any time after time $T_1$, the dual mode rate servo produces signal $Q_2$ at alternate high and low levels, the relative duration of the high and low levels of signal $Q_2$ depending upon the phase of the $V_f$ signals with respect to the $S_f$ signals. For example, referring now to the $S_f$ signal that occurs at time $T_2$ in Fig. 3, because flip-flop $Q_1$ is at its "zero" state signal $Q_2$ is a high level signal. When at time $T_2$ the $S_f$ signal is applied to gate $G_4$, as hereinbefore mentioned, gate $G_4$ will pass it as an actuating pulse B to the S input of flip-flop $Q_2$ to cause flip-flop $Q_2$ to be "set," thereby causing differentiator 25 in turn to emit a negative feedback pulse $\bar{Q}'_2$ which is applied to the S input of flip-flop $Q_1$. Flip-flop $Q_1$ is thereby "set" by the feedback pulse to the same state (the "set" state) that flip-flop $Q_2$ has just been placed in. In the same manner, when at time $T_3$, the following $V_f$ signal zeroes flip-flop $Q_2$, the resultant feedback pulse $Q'_2$ will zero flip-flop $Q_1$ correspondingly.

It is thus seen that in the phase mode of operation, as shown in Fig. 3, flip-flop $Q_1$ is slaved to flip-flop $Q_2$ in that it will always change state to agree with new states of flip-flop $Q_2$, due to the feedback signals hereinbefore mentioned. In this condition, the output signals $Q_1$ and $\bar{Q}_1$ always permit free passage of signals $V_f$ and $S_f$ through gates $G_3$ and $G_4$ to respectively "zero" and "set" flip-flop $Q_2$. Thus during the phase mode of operation flip-flop $Q_2$ will be zeroed by each $V_f$ signal and "set" by each $S_f$ signal thus casing signal $Q_2$ to have alternate low and high levels in accordance with the occurrence of $V_f$ and $S_f$ signals.

The dual mode system in a phase mode of operation will reach a stable status as shown in Fig. 3, at time $T_4$, holding the frequency of the $S_f$ and $V_f$ signals thereafter equal and maintaining the two signals out of phase by substantially 180°. The dual mode phase-frequency form of rate servo will continue in its phase mode of operation until the stable status, hereinbefore mentioned, is disturbed in some manner (as for example, by a current disturbance) to such a degree that either two successive $V_f$ or $S_f$ signals will occur, at which time the dual mode rate servo will change back to a frequency form of operation, as illustrated in Fig. 4.

Figure 4:
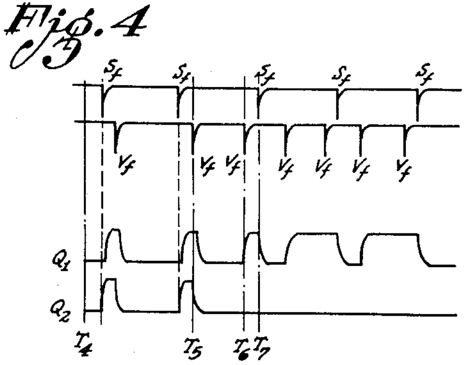

Referring now to Fig. 4, wherein the waveforms shown, can for purposes of example, be considered an extension of the waveforms shown in Fig. 3, it can be seen that at times earlier than time $T_5$ the dual mode rate servo continues to operate in its phase mode of operation. However, it is assumed that shortly after time $T_5$ some disturbance took place, as for example, a change in the voltage at which current is supplied, that forced the speed of movable element 11 to increase, thereby increasing the frequency of the $V_f$ signals. Due to the increased frequency of the $V_f$ signals, the period between the $V_f$ signals occurring at times $T_5$ and $T_6$ is small enough so that two successive $V_f$ signals will occur and therefore, the dual mode rate servo will change to a frequency mode of operation.

Attention is directed to the time preceding time $T_6$ which it can be seen from Fig. 4, that flip-flops $Q_1$ and $Q_2$ are at their "zero" states. When the $V_f$ signal occurring at time $T_6$ is applied to gate $G_3$ signal $Q_1$ is at its low level so that, as hereinbefore described, gate $G_3$ will not emit an actuating pulse and flip-flop $Q_2$ will remain zeroed. However, since the $V_f$ signal is simultaneously applied to the S input of flip-flop $Q_1$ it is effective for setting flip-flop $Q_1$. Because flip-flop $Q_2$ has not changed its state no feedback signal can be formed, as hereinbefore mentioned. Thus immediately after time $T_6$ flip-flop $Q_2$ is at its "zero" state and flip-flop $Q_2$ is at its "set" state, this having the effect of ensuring, as described hereinbelow that flip-flop $Q_1$ is no longer slaved to flip-flop $Q_2$.

For example, when at time $T_7$ and $S_f$ signal occurs, it will be applied to gate $G_4$, but since signal $\bar{Q}_1$ is at its low level, gate $G_4$ will not emit an actuating pulse and therefore flip-flop $Q_2$ will remain in a "zero" state (indicating in accordance with the frequency mode of operation that the frequency of signals $V_f$ is greater than the frequency of signals $S_f$).

It can be seen that the dual mode rate servo will thereafter continue to operate in this frequency mode of operation until the phase and frequency of the $S_f$ and $V_f$ signals are near equal. As shown in Fig. 4, after time $T_5$ flip-flop $Q_2$ remains at its "zero" state, it is thereby acting to decelerate movable element 11 to a relatively low velocity. Therefore the frequency of the $V_f$ signals will decrease as the speed of movable element 11 decreases and it will be understood that in continuing operation a point will soon be reached at which the phase and the frequency of the two signals are again nearly equal. At that time the dual mode rate servo system will change again from a frequency mode of operation to a phase mode of operation and maintain the frequency of the $V_f$ signal equal to that of the $S_f$ signal as hereinbefore described in connection with Fig. 3. Thus it is clear that in overall operation, the dual mode phase-frequency form of rate servo functions to increase or decrease the velocity of movable element 11 at a velocity proportional to the frequency of applied $S_f$ signals with the highest degree of accuracy.

The embodiment of the dual mode phase-frequency form of rate servo hereinbefore described is operable with pulse type $S_f$ and $V_f$ signals. In a few special applications it is desirable to operate with either one or both of the $S_f$ and $V_f$ signals being a signal of long duration. The dual mode phase-frequency form of rate servo hereinbefore described, may be readily modified so that it is operable with signals of relatively long duration, one such modified embodiment being shown in Fig. 5.

Figure 5:
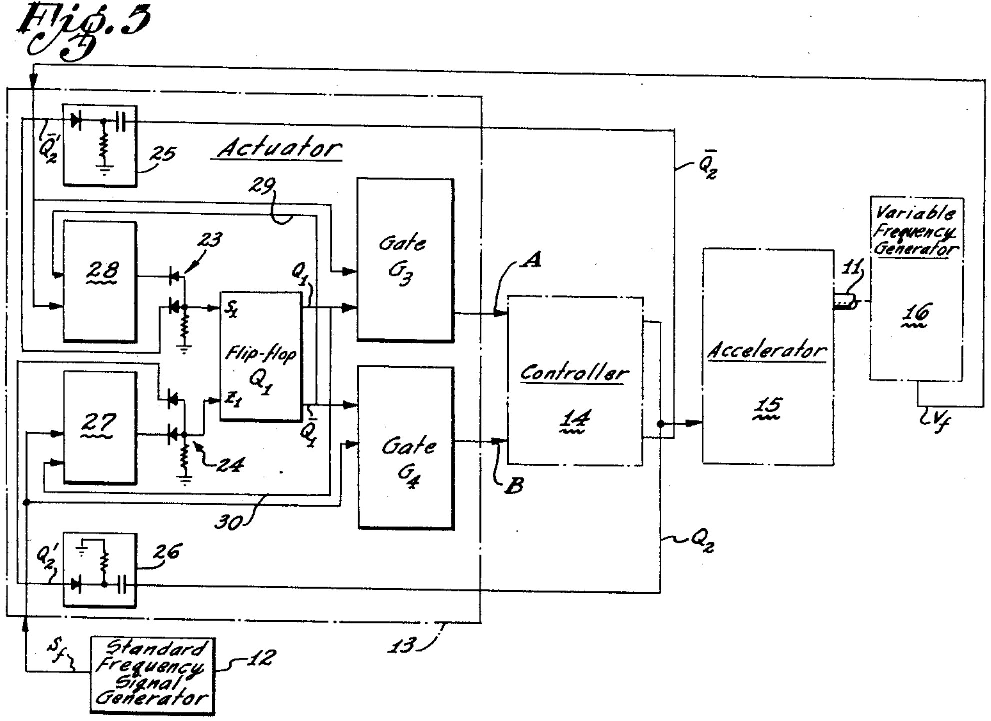
Fig. 5 is a partly block, partly circuit diagram illustrating a modification of the rate servo shown in Fig. 2.

Referring now to Fig. 5, there is shown a modified embodiment of the dual mode phase-frequency form of rate servo which is operable with $S_f$ and $V_f$ signals of relatively long duration. As illustrated in Fig. 5, the dual mode phase-frequency form of rate servo shown in Fig. 2 is modified by applying signals $Q_1$ and $\bar{Q}_1$ to a gate 27 and a gate 28, respectively over a pair of input conductors 30 and 29, respectively. Further, signals $S_f$ and $V_f$ are applied to gates 27 and 28, respectively, and the output of gates 27 and 28 are applied to its input terminals of mixing circuits 24 and 23, respectively, where they are mixed with signals $Q'_2$ and $\bar{Q}'_2$, respectively, and applied to the Z and S inputs, respectively of flip-flop $Q_1$. Gates 27 and 28 are high pass pulse gates similar in structure and function to gates $G_3$ and $G_4$, hereinbefore mentioned.

The unmodified embodiment of the dual mode rate servo as shown in Fig. 2, could not operate with $S_f$ and $V_f$ signals of long duration for the reason that such signals applied to the S or Z inputs of flip-flop $Q_1$, would interfere with the application of the feedback signals $Q_2$ or $\bar{Q}_2$ to flip-flop $Q_1$. What would occur is that a long duration $S_f$ or $V_f$ signal would still be present at an input of flip-flop $Q_1$ at the time that an immediately succeeding $Q'_2$ or $\bar{Q}'_2$ signal was fed back, thereby preventing flip-flop $Q_1$ from responding to the fed back signals. This difficulty caused by long duration $S_f$ and $V_f$ signals is eliminated in the embodiment of Fig. 5, by shortening the received $V_f$ and $S_f$ signals by passing them through gates 28 and 29 respectively, these gates functioning as described hereinbelow, to clip off the tail ends of the applied $V_f$ and $S_f$ signals.

Referring now with particularly to Fig. 5, assume that flip-flop $Q_1$ is initially in its "zero" state so that signal $\bar{Q}_1$ is at its high level, and assume also that the $S_f$ and $V_f$ signals are of a long duration. A $V_f$ signal applied to gate 28 at this time could pass to the output of gate 28, since signal $\bar{Q}_1$ at its high level will be present at the other input of gate 28. The passed $V_f$ signal will then be applied to the S input of flip-flop $Q_1$ and thereby cause the flip-flop to be "set." However, when flip-flop $Q_1$ is "set," signal $\bar{Q}_1$ changes to its low level state and therefore, signal $\bar{Q}_1$ is applied to the input of gate 28 at its low level. Now if the $V_f$ signal is of such a long duration that the tail of the signal is still passing through gate 28, the tail will be "clipped-out" or "cut-off" since gate 28, as hereinbefore mentioned, can no longer pass a signal. Thus the tail of the $V_f$ signal will not be applied to the input of flip-flop $Q_1$ and therefore cannot mask out a possible feedback signal from flip-flop $Q_2$.

$S_f$ signals are similarly shortened in duration by passage through gate 27. Each passed $S_f$ signal will be applied to the Z input of flip-flop $Q_1$ and thereby cause the flip-flop to be "zeroed." However, when flip-flop $Q_1$ is "zeroed," signal $Q_1$ falls to its low level, thus cutting off the tail of the $S_f$ signal still passing through gate 27. Thus the tail of the $S_f$ signal will not be applied to the input of flip-flop $Q_1$ and therefore will not mask out a possible feedback signal from flip-flop $Q_2$.

It will be understood, of course, that the rate servo of the invention may be modified or altered in many particulars without departing from the invention. For example, although it was stated hereinbefore that gates $G_3$ and $G_4$ were high pass gates, it is clear that the rate servo of the invention may be modified to operate with low pass gates by merely interchanging conductors $Q_1$ and $\bar{Q}_1$. Accordingly, it is to be expressly understood that the invention is to be limited only by the spirit and scope of the appended claims.

What is claimed as new is:

1. In a servo for driving a movable element at a velocity proportional to the frequency of applied standard frequency signals, the combination comprising: signal generating means for generating variable frequency signals whose frequency is proportional to the velocity of the movable element; first means responsive to said variable frequency signals and the standard signals, said first means being normally operable in a first mode of operation for producing a first signal when the frequency of said variable frequency signals exceeds the frequency of the standard frequency signals and a second signal when the frequency of said variable frequency signals is less than the frequency of the standard frequency signals; second means responsive to said first and second signals for producing a control signal having first and second levels, respectively; and accelerating means, responsive to said control signal at its first and second levels, for accelerating said movable element at predetermined first and second rates, respectively.

2. The combination defined in claim 1 which further includes feedback means, coupled between said first and second means, for transmitting a feedback signal to said first means whenever said control signal changes its level to render said first means inoperable in its first mode of operation and operable in a second mode of operation, said first means being responsive in its second mode of operation to each standard frequency signal and each variable frequency signal for producing said first and second signals, respectively.

3. The combination defined in claim 1 which further includes feedback means, coupled between said first and second means, for applying said control signal as a feedback signal to said first means, said first means including apparatus responsive to said feedback control signal for rendering said first means inoperable in its first mode of operation and operable in a second mode of operation.

said first means being responsive in its second mode of operation to each standard frequency signal and each variable frequency signal for producing said first and second signals, respectively.

4. The combination defined in claim 2 wherein said first means includes a bistable element and two "and" gates.

5. The combination defined in claim 4 wherein said second means includes one bistable element.

6. The combination defined in claim 5 wherein said accelerating means includes an induction motor.

7. The combination defined in claim 1 wherein said first means further includes means operable for producing said first signal when two successive standard frequency signals are received and said second signal when two successive variable frequency signals are received.

8. A dual mode, phase-frequency servo for controlling the power applied to a motor to maintain the frequency and phase of the motor shaft constant relative to applied standard frequency signals, said servo comprising: first means for producing motor shaft signals whose repetition frequency is representative of the speed of the motor shaft and whose phase relative to the standard frequency signals is representative of the phase of the motor shaft; second means selectively actuable for producing a first or a second output signal; power applying means coupled to the motor and responsive to said first and second output signals for applying power to said motor at first and second predetermined rates respectively; third means, receiving the standard frequency signals and said motor shaft signals and responsive to two successive standard frequency signals or two successive motor shaft signals, for actuating said second means to produce said first or second output signals respectively, said third means also being responsive to substantially coincidental standard frequency and motor shaft signals for actuating said second means during alternate time intervals to produce first and second output signals respectively, the relative durations of the time intervals being proportional to the phase of the motor shaft signals to the standard frequency signals.

9. The combination defined in claim 8 wheretin said third means includes two "and" gates and two bistable elements.

10. The combination defined in claim 9 wherein said second means includes one bistable element.

11. The combination defined in claim 8 wherein said motor is an induction motor.

12. A dual mode, phase-frequency servo for controlling power applied to a motor to maintain the frequency and phase of the motor shaft constant relative to applied standard frequency signals, said servo comprising: first means, coupled to the motor shaft, for producing motor shaft signals whose repetition frequency is representative of the speed of the motor shaft and whose phase relative to the standard frequency signal is representative of the phase of the motor shaft; second means, receiving the standard frequency signals and the motor shaft signals, said second means being actuable for producing a first output signal in response to two successive standard frequency signals and a second output signal in response to two successive motor shaft signals; third means, receiving the standard frequency signals and said motor shaft signals, said third means being actuable for producing said first and second output signals in alternate time periods, the relative duration of the time periods being proportional to the phase of the motor shaft signals relative to the standard frequency signals; fourth means coupled to the motor and responsive to said first and second output signals for controlling the power delivered to the motor; and fifth means for selectively actuating either said second means or said third means, said fifth means being responsive to two successive standard frequency signals or two successive motor shaft signals for actuating said second means and responsive to substantially coincidental standard frequency and motor shaft signals for actuating said third means.

13. In a dual mode servo for driving a movable element at a velocity proportional to the frequency of an applied standard frequency signal, the combination comprising: accelerating means actuable for accelerating the movable element at a rate less than or equal to a maximum rate and greater than or equal to a minimum rate; signal generating means coupled to the movable element for generating a variable frequency output signal whose frequency is proportional to the velocity of the movable element; first means responsive to said variable frequency signal and the standard signal when their frequency difference is less than a predetermined value for actuating said accelerating means to accelerate said movable element at a rate proportional to the phase of the variable frequency signal relative to the standard frequency signal; second means responsive to said variable frequency signal and the standard frequency signal when their frequency difference exceeds the predetermined value for actuating said accelerating means to accelerate said movable element at said maximum or minimum rate.

No references cited.